Nov. 10, 1953 — W. O. WHEELER — 2,658,444
FOOD CONTAINER FOR DEEP FAT FRYING
Filed March 15, 1951
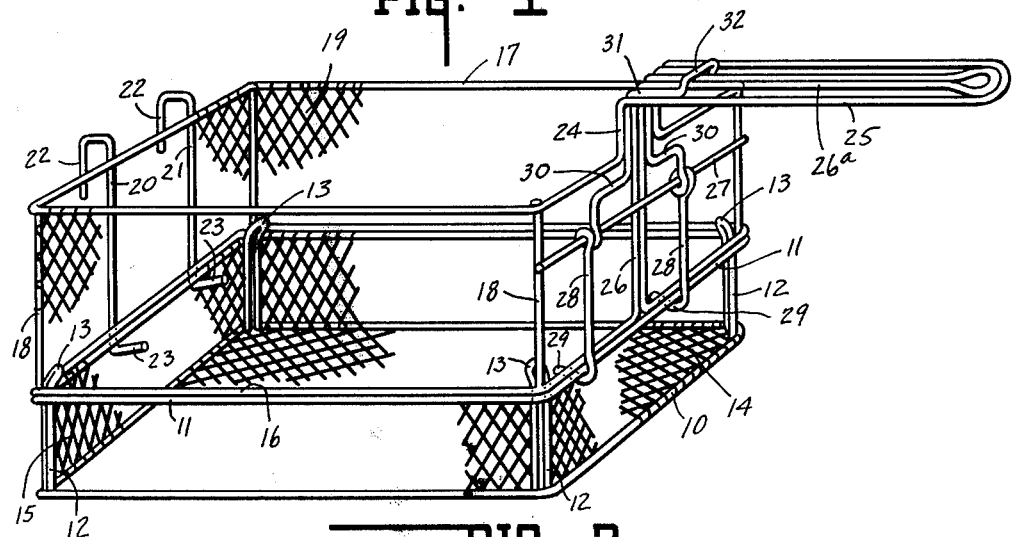
INVENTOR.
WILLIAM O. WHEELER.
BY
Lockwood, Hahn, Galt + Woodard,
ATTORNEYS.

UNITED STATES PATENT OFFICE 2,658,444

FOOD CONTAINER FOR DEEP FAT FRYING

William O. Wheeler, Indianapolis, Ind.

Application March 15, 1951, Serial No. 215,665

1 Claim. (Cl. 99—410)

The present invention relates to improvements in food trays, and particularly to that type of tray which is used for supporting the food in the cooking medium, which is generally a liquid medium with the food immersed in the cooking medium.

An example of the use of such tray, or trays, is where food is prepared or cooked by deep fat frying, that is where a supply of hot fat is provided in a suitable container, and the food is immersed in the hot fat to the point where it is completely covered by the fat.

The usual custom in trays of this character, in order that the food may be immersed thoroughly in the fat, is to provide an extremely deep tray, although in most instances the food occupies only a small proportion of the height of the tray. The rest of the height of the tray is necessary in order that complete immersion may be obtained.

These trays are of foraminous material so that the cooking medium may penetrate and contact all of the food contained in the tray.

One great objection to the trays of the commercial art heretofore used, and particularly to those used in commercial restaurants and the like, is that, the food occupying only a small portion of the tray, in order to remove the food therefrom the tray is generally turned upside down to dump the food therefrom, resulting in either the destruction of the appearance of the food, by the food becoming mashed, or in the loss, in those instances where the food is prepared with a breaded or other coating, of the coating before it is served to the customer.

Furthermore, such trays occupy considerable space; and where the food is prepared in advance of the cooking and then stored, the height of the tray is such that unnecessary storage space is required.

It is one of the objects of the present invention to provide a food tray having the above characteristics, which will permit the placing of the food in a rather shallow container, the height of which may be increased by a suitable detachable means so that when the food is removed from the cooking medium, the increased height section may be detached, permitting easy access to the food in the shallow part of the tray.

A further object is to provide a structure wherein the increased height portion of the tray may be used in connection with any number of different trays.

Such an arrangement permits of the advance preparation of the food, placing the same in the shallow tray, which may be so constructed that a number of shallow trays may be stacked one upon the other, and which may then be picked up by the height increasing portion of a tray to be supported immersed in the cooking medium.

For the purpose of disclosing the invention I have illustrated certain embodiments thereof in the accompanying drawings in which Fig. 1 is a perspective view of a tray embodying my invention.

Fig. 2 is a partial end perspective, the foraminous walls being left off, of a modified form of the structure illustrated in Fig. 1, and Fig. 3 is a view similar to Fig. 2 of still a further modification of my invention.

In the embodiment of the invention illustrated I provide a bottom tray or a shallow food containing tray, which comprises a bottom, preferably rectangular, frame 10 which may be formed of wire and bent in to a suitable rectangular shape, and correspondingly shaped top frame 11. The two frames are spaced apart and held in their respectively spaced position by corner posts 12, which may be in the form of wire loops suitably welded to the corners of the top frame 11 and the bottom frame 10. These loops have their looped end extending upwardly and bent inwardly to provide guide ears 13.

The frame is provided with a foraminous bottom 14, which may be of wire or mesh or may be of any other foraminous material, and with foraminous sides 15 of like material. The side walls and bottom may be secured to the top and bottom frames by any suitable manner, as by spot welding or otherwise.

Cooperating with the relatively shallow tray is a side wall extension unit. This side wall extension unit comprises a substantially rectangular frame 16, corresponding in size and shape to the bottom tray and a top rectangular frame 17. The two frames are connected together by corner post wires 18, which are spot welded or otherwise suitably secured at the corners of and to the bottom frames. This frame is provided with foraminous side walls 19, which may be of the same material as the walls and bottom of the shallow tray. It is to be noted that this side wall extension has no bottom. One end of the extension is provided with supporting hooks, which may be in the form of vertically extending wire members 20 and 21 having their top ends extending above the top of the frame 17 and bent over to provide supporting hooks 22—22. The bottom ends of these wires are bent inward to provide locking lugs 23—23, which may engage beneath the end member of the top frame 11 of the bottom tray to lock the side wall extension to the bottom tray at this point.

To provide a carrying handle for the entire structure, the ends of the frame 17 opposite the hook wires 20 and 21 are bent upwardly as at 24 and then rearwardly as at 25, these ends being spaced apart and providing a handle structure. Likewise, the ends of the bottom frame 16 are bent upwardly as at 26 and then rearwardly as at 26a to complete the handle structure.

A cross member 27 extends between a pair of the end posts 18 being suitably welded in position, and this cross member provides a pivot member on which a pivotal hook structure may be mounted. In the structure illustrated in Fig. 1 this pivotal hook structure comprises a pair of spaced apart wire members 28, the lower ends of which are inwardly bent to provide hooks 29, and these wires are wrapped around the cross member 27, then extend upwardly being bent inwardly as at 30; and the upward extensions are bent rearwardly as at 31, occupying the space between the handle members formed by the wires 26. This rearwardly extending portion is comparatively short and is provided with an upwardly extending hook 32, which extends above the plane of the handle member.

By the above construction it is obvious that the side wall extension unit may be readily connected to the relatively shallow tray section, by first engaging the hooks or members 23 beneath the rear end of the top frame 11, with the hook members 29 retracted. After the engagement is effected by the hook members 23, the hooks 29 may be engaged beneath the opposite end of the frame 11 by depressing the loop 32. In order to release the member, the operator while grasping the handle may merely slide his thumb beneath the raised loop 32, which, of course, will retract the hooks 29.

In the structure illustrated in Fig. 2 the end member 34 of the removable section is bent upwardly as at 35 and then rearwardly at 36 to form a portion of the carrying handle, and the top end portion 37 of the frame is bent rearwardly to form the handle extension 38 instead of, as in Fig. 1, first upwardly and then rearwardly.

In this structure the removable hook structure has its loops hingedly mounted directly on the end member 37.

In the structure illustrated in Fig. 3 I have shown still a modification of the releasable hook structure wherein the two parallel, vertically extending wires 39 have their lower ends inturned by the hooks 40 and their upper ends rearwardly bent as at 41 connected together by an upwardly extending loop 42. These rearwardly extending portions are spaced between the handle members 25 and 26a and are slidable to release the hooks instead of being pivoted. They are maintained in their position by a suitable enclosing band 43.

It is to be noted that due to the upwardly and inwardly inclined ears 13, the side wall extension is guided in and braced in position and braced against transverse movement relatively to the bottom of the tray. Furthermore, these upwardly and inwardly extending ears 13 provide guide members, which enable a number of the shallow food trays to be stacked one upon the other in the manner as illustrated in Figs. 2 and 3.

The invention claimed is:

A structure for supporting food to be cooked in an immersed position in a cooking medium comprising a relatively shallow food supporting tray having top and bottom rectangular frames, a foraminous bottom connected to said bottom frame and foraminous walls secured to the sides and ends of said top and bottom frames, a wall extension unit of foraminous material conforming in outline to that of said tray, one end wall of said unit having rigidly secured inturned hooks engageable beneath said top frame, a carrying handle extending laterally from adjacent the top of the other end wall of said unit, and hook means associated with said handle and with said other end wall of said unit swingable in and out of engagement with the adjacent end of the top frame of said tray, said means being pivotally connected to said other end of said unit and being operable from said handle.

WILLIAM O. WHEELER.

References Cited in the file of this patent
UNITED STATES PATENTS

| Number | Name | Date |
| --- | --- | --- |
| 858,698 | Smith | Apr. 2, 1907 |
| 892,020 | Walburn | June 30, 1908 |
| 1,266,816 | Kinnie | May 21, 1918 |
| 1,384,851 | Richardson | July 19, 1921 |
| 1,493,948 | Apple | May 13, 1924 |
| 1,648,025 | Molloy | Nov. 8, 1927 |
| 2,228,787 | Snyder | Jan. 14, 1941 |
| 2,472,404 | Cadwell | June 7, 1949 |
| 2,577,985 | Willman | Dec. 11, 1951 |
| 2,586,005 | Colonna | Feb. 19, 1952 |